United States Patent
Arzi et al.

(10) Patent No.: US 10,462,160 B2
(45) Date of Patent: *Oct. 29, 2019

(54) METHOD AND SYSTEM FOR IDENTIFYING UNCORRELATED SUSPICIOUS EVENTS DURING AN ATTACK

(71) Applicant: CHECK POINT SOFTWARE TECHNOLOGIES LTD., Tel Aviv (IL)

(72) Inventors: Lior Arzi, Givatayim (IL); Tamara Leiderfarb, Modi'in (IL); Anandabrata Pal, Rehovot (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 288 days.

This patent is subject to a terminal disclaimer.

(21) Appl. No.: 15/292,169

(22) Filed: Oct. 13, 2016

(65) Prior Publication Data

US 2017/0171240 A1    Jun. 15, 2017

Related U.S. Application Data

(60) Provisional application No. 62/264,881, filed on Dec. 9, 2015.

(51) Int. Cl.
*H04L 29/06* (2006.01)
*G06F 21/56* (2013.01)

(52) U.S. Cl.
CPC ........ *H04L 63/1416* (2013.01); *G06F 21/566* (2013.01)

(58) Field of Classification Search
None
See application file for complete search history.

(56) References Cited

U.S. PATENT DOCUMENTS

| | | | | |
|---|---|---|---|---|
| 7,293,281 | B1* | 11/2007 | Moran | H04L 63/101 705/51 |
| 8,474,043 | B2* | 6/2013 | Sturges | H04L 63/1416 726/23 |
| 9,177,153 | B1* | 11/2015 | Perrig | G06F 21/57 |
| 9,531,736 | B1* | 12/2016 | Torres | H04L 63/1408 |
| 9,843,596 | B1* | 12/2017 | Averbuch | H04L 63/1416 |
| 2004/0049693 | A1* | 3/2004 | Douglas | G06F 21/552 726/23 |

(Continued)

*Primary Examiner* — Farid Homayounmehr
*Assistant Examiner* — Olanrewaju J. Bucknor
(74) *Attorney, Agent, or Firm* — Mark M. Friedman (57) ABSTRACT

Computerized methods and systems identify events associated with an attack initiated on an endpoint client. A listing of processes executed or created on the endpoint during the attack is obtained. The listing of processes includes a first process and at least one subsequent process executed or created by the first process. The computerized methods and systems analyze for the occurrence of at least one event during a time interval associated with the attack. The computerized methods and systems determine whether the listing of processes includes a process that when executed caused the occurrence of the at least one event. If the listing of processes excludes process that when executed caused the occurrence of the at least one event, the at least one event and the causing process are stored, for example, in a database or memory.

21 Claims, 4 Drawing Sheets

(56) References Cited

U.S. PATENT DOCUMENTS

| | | | |
|---|---|---|---|
| 2005/0138413 A1* | 6/2005 | Lippmann | G06F 21/577 726/4 |
| 2006/0173992 A1* | 8/2006 | Weber | H04L 63/1425 709/224 |
| 2009/0044277 A1* | 2/2009 | Aaron | H04L 63/1408 726/25 |
| 2010/0082513 A1* | 4/2010 | Liu | H04L 63/1458 706/46 |
| 2010/0333002 A1* | 12/2010 | Karabey | G06Q 10/10 715/764 |
| 2015/0047032 A1* | 2/2015 | Hannis | H04L 63/1416 726/23 |
| 2015/0264062 A1* | 9/2015 | Hagiwara | G06F 21/56 726/24 |
| 2016/0044049 A1* | 2/2016 | Xing | H04L 63/14 726/23 |
| 2016/0239661 A1* | 8/2016 | Kawauchi | G06F 21/55 |
| 2016/0285894 A1* | 9/2016 | Nelms | H04L 63/145 |
| 2018/0234310 A1* | 8/2018 | Ingalls | H04L 41/22 |

* cited by examiner

METHOD AND SYSTEM FOR IDENTIFYING UNCORRELATED SUSPICIOUS EVENTS DURING AN ATTACK

CROSS-REFERENCE TO RELATED APPLICATIONS

This application claims priority from U.S. Provisional Patent Application No. 62/264,881, filed Dec. 9, 2015, whose disclosure is incorporated by reference in its entirety herein. This application is also related to the commonly owned U.S. patent applications entitled: 1) Method and System for Determining Initial Execution of an Attack (U.S. patent application Ser. No. 14/963,265); 2) Method and System for Modeling All Operations and Executions of an Attack and Malicious Process Entry (U.S. patent application Ser. No. 14/963,267); 3) Method and System for Highlighting Important Events During an Attack (U.S. Provisional Patent Application Ser. No. 62/264,891); and 4) Method and System for Detecting and Remediating Polymorphic Attacks Across an Enterprise (U.S. Provisional Patent Application Ser. No. 62/264,890), all filed on Dec. 9, 2015, and all of the disclosures of the aforementioned applications incorporated by reference in their entirety herein.

TECHNICAL FIELD

The present invention relates to methods and systems for detecting potential malware.

BACKGROUND OF THE INVENTION

Malware is any software used to disrupt computer operations, gather sensitive information, or gain access to private assets residing in computer systems. This can lead to the malware creator or other unauthorized parties gaining access to the computer system and private information stored on the computer system being compromised. Malware includes computer viruses, worms, trojan horses, spyware, adware, key loggers, and other malicious programs. These programs can appear in the form of computerized code, scripts, and other software.

Software, such as, for example, anti-virus, anti-spyware, anti-malware and firewalls, are depended upon by computer users for protecting against malware and other malicious attacks. These types of protective software also help to identify malware attacks and take protective actions in response to identification of a malware attack.

SUMMARY OF THE INVENTION

The present invention is directed to computerized methods and systems, which identify suspicious events, occurring during an attack on an endpoint client, which may be involved with the attack. When an attack is detected, an agent on the endpoint is provided with a listing of all processes involved with the attack. The listing is preferably provided to the agent in the form of a tree. The tree depicts the initial process execution (i.e. call) of the attack as the root (i.e. root node) of the tree. The remaining nodes of the tree represent the processes created and/or executed, either directly or indirectly, by the initial process execution, as well as any files created or accessed by any of the above mentioned processes. The agent identifies suspicious events that occurred during a time interval associated with the attack. Suspicious events occurring within the associated time interval that were caused by process calls not listed in the listing provided to the agent are labeled and stored for further examination by the agent.

Embodiments of the present invention are directed to a method for identifying events associated with an attack initiated on an endpoint. The method comprises: obtaining a listing of processes executed or created on the endpoint during the attack, the processes including a first process and at least one subsequent process executed or created by the first process; analyzing whether at least one event occurred on the endpoint during a time interval associated with the attack; and determining whether the listing of processes includes a process that when executed caused the occurrence of the at least one event.

Optionally, the method further comprises: identifying the process that when executed caused the occurrence of the at least one event.

Optionally, the method further comprises: storing in a memory at least one characteristic of the process that when executed caused the occurrence of the at least one event if the listing of processes excludes the process that when executed caused the occurrence of the at least one event.

Optionally, the method further comprises: determining the time interval associated with the attack.

Optionally, the time interval associated with the attack is defined in part by a respective start time associated with each process in the listing of processes and a respective end time associated with each process in the listing of processes.

Optionally, the at least one event is selected from the group consisting of: an access or modification of a data item in a user directory of the endpoint, an injection into an endpoint operating system process, a deletion of at least one process from the listing of processes, an access to a data item or application on the endpoint that satisfies a user defined classification criterion, a process executed on the endpoint lacking a digital signature, a data item having a digital certificate obtained from an untrusted certificate authority, and the creation of a first file having the same hash value as the hash value of a second file.

Optionally, the method further comprises: storing in a memory the at least one event if the listing of processes excludes the process that when executed caused the occurrence of the at least one event.

Optionally, the listing of processes includes a model of the attack on the endpoint.

Optionally, the model of the attack is a tree structured model.

Optionally, the analyzing whether the at least one event occurred on the endpoint during the time interval associated with the attack includes: obtaining a listing of events that occurred on the endpoint; and determining whether any of the events rendered from the listing of events occurred during the time interval associated with the attack.

Optionally, the method further comprises: causing a taking protective action if the listing of processes includes the process that when executed caused the occurrence of the at least one event.

Optionally, the taking of protective action includes restoring at least one value of a data item to an original value.

Optionally, the first process is defined as an initial execution of the attack initiated on the endpoint.

Optionally, the at least one event is a suspicious event.

Embodiments of the present invention are directed to a computer system for identifying events associated with an attack initiated on an endpoint. The computer system comprises: a storage medium for storing computer components; and a computerized processor for executing the computer components. The computer components comprise: a computer module configured for obtaining a listing of processes executed or created on the endpoint during the attack, the processes including a first process and at least one subsequent process executed or created by the first process; analyzing whether at least one event occurred on the endpoint during a time interval associated with the attack; and determining whether the listing of processes includes a process that when executed caused the occurrence of the at least one event.

Optionally, the computer system further comprises: a database for storing a listing of events that occurred on the endpoint during the attack Optionally, the computer module is further configured for: retrieving the listing of events that occurred on the endpoint from the database, and determining whether any of the events rendered from the listing of events occurred during the time interval associated with the attack.

Optionally, the computer system further comprises: a database for storing the at least one event, and the computer module is further configured for storing the at least one event in the database if the listing of processes excludes the process that when executed caused the occurrence of the at least one event.

Optionally, the computer module is further configured for: identifying the process that when executed caused the occurrence of the at least one event.

Optionally, the computer system further comprises: a database for storing at least one characteristic of the process that when executed caused the occurrence of the at least one event, and the computer module is further configure for: storing the at least one characteristic of the process that when executed caused the occurrence of the at least one event if the listing of processes excludes the process that when executed caused the occurrence of the at least one event.

Optionally, the computer module includes an agent.

Embodiments of the present invention are directed to a computer usable non-transitory storage medium having a computer program embodied thereon for causing a suitable programmed system to identify events associated with an attack initiated on an endpoint, by performing the following steps when such program is executed on the system. The steps comprise: obtaining a listing of processes executed or created on the endpoint during the attack, the processes including a first process and at least one subsequent process executed or created by the first process; analyzing whether at least one event occurred on the endpoint during a time interval associated with the attack, and determining whether the listing of processes includes a process that when executed caused the occurrence of the at least one event.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g. laptop, desktop, tablet computer), or any type of computing device, including mobile devices that can be readily transported from one location to another location (e.g. smartphone, personal digital assistant (PDA), mobile telephone or cellular telephone).

A "process" refers to an instance of a computer program that is being executed (e.g. executable file). While a computer program is a passive collection of instructions; a process is the actual execution of those instructions. Each process provides the resources necessary to execute a program file. A process includes, for example, an image of the executable machine code associated with a program, memory (typically some region of virtual memory, which includes the executable code, process-specific data (input and output), a call stack (to keep track of active subroutines and/or other events), and a heap to hold intermediate computation data generated during run time), operating system descriptors of resources that are allocated to the process, such as handles (Windows), security attributes, such as the process owner and the process set of permissions (allowable operations), a unique identifier, and other attributes. A non-exhaustive list of examples of processes includes:

processes that are instances/executions of compression applications, such as, for example, zip applications, rar applications and the like;

processes that are instances/executions of network applications, such as, for example, email clients, web browsers (e.g. chrome, firefox, etc.), and FTP (file transfer protocol) clients;

processes that are instances/executions of payload applications, such as, for example, Microsoft® Office applications and Adobe® PDF Reader®;

processes that are instances/executions of executables written and maintained by the creators of the operating system (OS) (i.e., Microsoft®) and packaged on the computer as part of the operating system, such as, for example, services.exe and explorer.exe.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

The present invention is directed to computerized methods and systems, which identify suspicious events, occurring during an attack, such as, for example, a malicious attack on an endpoint client, which may be involved with the attack. An agent installed on an endpoint client monitors activity on the endpoint client computer, machine, or the like. When an attack is detected, the agent is provided with a listing of all processes involved with the attack. The listing is preferably provided to the agent in the form of a tree. The tree depicts the initial process execution (i.e. call) of the attack as the root (i.e. root node) of the tree. The remaining nodes of the tree represent the processes created and/or executed, either directly or indirectly, by the initial process execution, as well as any files created or accessed by any of the above mentioned processes. The agent identifies suspicious events that occurred during a time interval associated with the attack. Suspicious events that were caused by process calls not listed in the listing provided to the agent are labeled and stored for further examination by the agent. In the context of this document, processes categorized as "involved" in an attack on an endpoint generally refers to any process that can be traced back to the root of the attack.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 1:
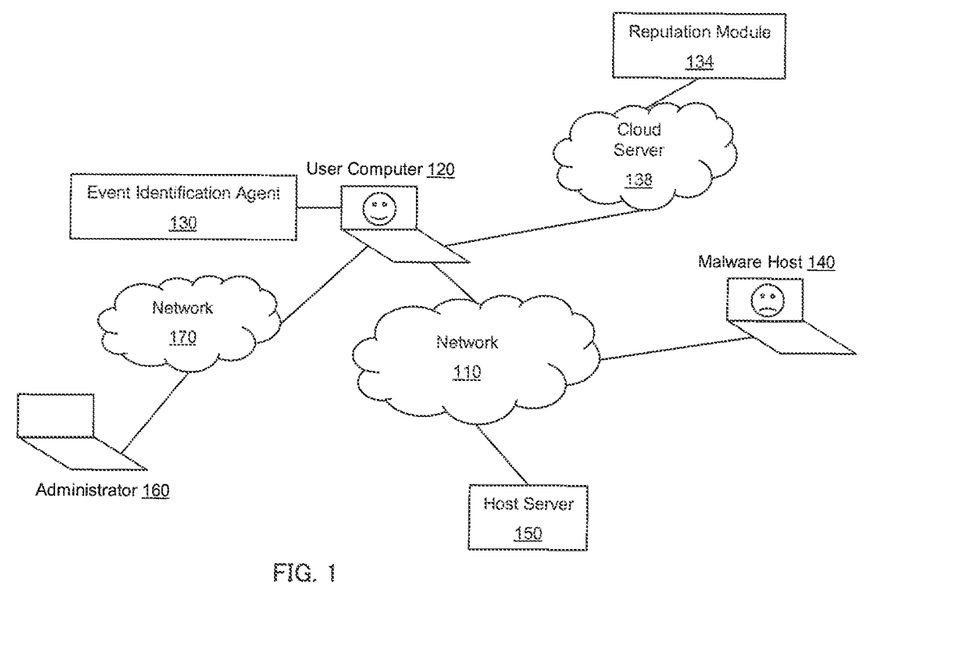
FIG. 1 is a diagram illustrating a system environment in which an embodiment of the invention is deployed.

Refer now to FIG. 1, an illustrative example environment in which embodiments of the present disclosure are performed over a network 110. The network 110 may be formed of one or more networks, including for example, the Internet, cellular networks, wide area, public, and local networks. The embodiments include a system 120' (FIG. 2), including, for example, an agent 130, on an endpoint client, for example, a user computer 120 (linked to the network 110). The agent 130 identifies suspicious events occurring during an attack on the user computer 120 in order to gauge involvement by such suspicious events with the attack. In a non-limiting example, a malware host 140, also linked to the network 110, creates a malicious file that when executed initiates the attack. The malicious file is made available to the host server 150 by the malware host 140. The host server 150 is linked to the network 110 and represents numerous servers hosting, for example, web sites, accessible through web servers (not shown). The malicious process enters the user computer 120 via the access of the host server 150 by the user computer 120.

The agent 130 includes software, software routines, code, code segments and the like, embodied, for example, in computer components, modules and the like, that are installed on machines, such as the user computer 120. For example, the agent 130 performs an action when a specified event occurs, as will be further detailed below. The agent 130 may be instructed to perform such actions by an administrator 160. The administrator may be a computer separate from the user computer 120 linked to the user computer 120 via a private network 170 such as an Intranet. Alternatively, the administrator 160 may be linked to the user computer 120 via the network 110.

Figure 2:
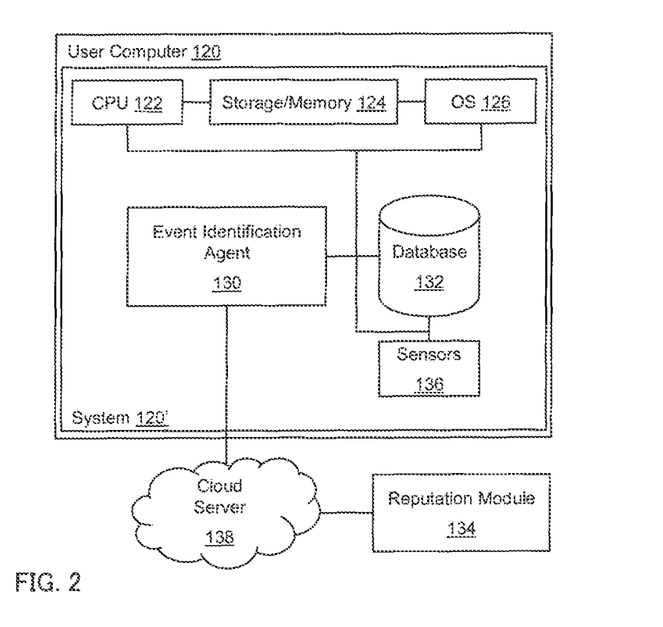
FIG. 2 is a diagram of the architecture of an exemplary system embodying the invention.

FIG. 2 shows the user computer 120 and the system 120' therein, as an architecture, with the agent 130 incorporated into the system 120' of the user computer 120. The system 120' is referred to as "the system" in the description of FIG. 4 below. All components of the user computer 120 and/or the system 120' are connected or linked to each other (electronically and/or data), either directly or indirectly.

Initially, the user computer 120 includes a central processing unit (CPU) 122, a storage/memory 124, and an operating system (OS) 126. The processors of the CPU 122 and the storage/memory 124, although shown as a single component for representative purposes, may be multiple components.

Figure 3:
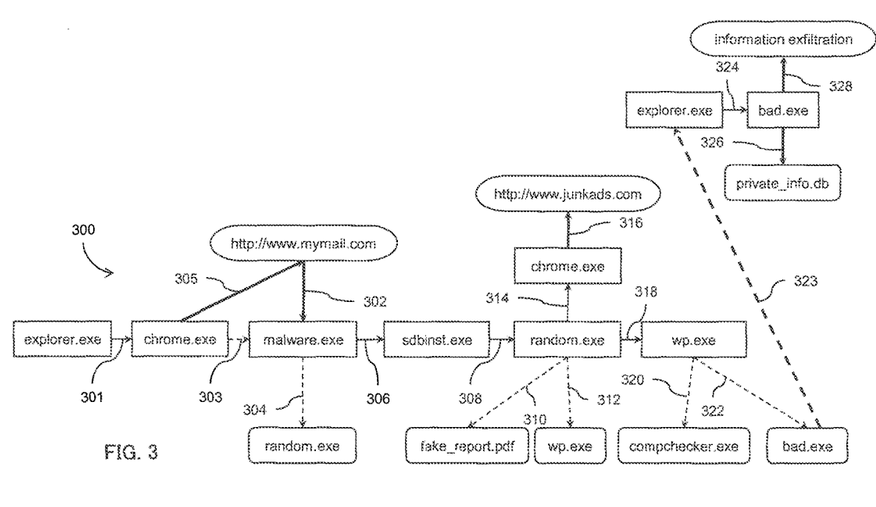
FIG. 3 is a diagram of an example of an attack.

The CPU 122 is formed of one or more processors, including microprocessors, for performing the user computer 120 functions, including executing the functionalities and operations of the agent 130, as detailed herein, the OS 126, and including the processes shown and described in the flow diagram of FIG. 3. The processors are, for example, conventional processors, such as those used in servers, computers, and other computerized devices. For example, the processors may include x86 Processors from AMD and Intel, Xenon® and Pentium® processors from Intel, as well as any combinations thereof.

The storage/memory 124 is any conventional storage media. The storage/memory 124 stores machine executable instructions for execution by the CPU 122, to perform the processes of the present embodiments. The storage/memory 124 also includes machine executable instructions associated with the operation of the components, including the agent 130, and all instructions for executing the processes of FIG. 4, detailed herein.

The OS 126 includes any of the conventional computer operating systems, such as those available from Microsoft of Redmond Wash., commercially available as Windows® OS, such as Windows® XP, Windows® 7, MAC OS from Apple of Cupertino, Calif., or Linux.

Activity that occurs on the user computer 120 is sensed by a sensor or sensors 136 on the user computer 120. In particular, the sensors 136 are configured to sense changes that occur on the user computer 120. Examples of activity sensed by the sensors 136 includes, but is not limited to file accesses, network accesses, application accesses, registry accesses, file creations, file modifications, process calls and process creations. The activity sensed by the sensors 136 is written to (i.e. stored in) an activity log which can be maintained in a structured format, such as, for example, a database 132, accessible by the agent 130.

The database 132 may be installed with the system 120', or may be provided on a remote server, such as, for example, a cloud server 138 (and remain part of the system 120'). The activity log preferably also includes information, such as, for example, time stamps (e.g. execution start time, execution end time, duration), and process thread information, for each activity stored in the activity log.

Accordingly, the activity log stores for each process call the timing and thread information associated with each process as well as a listing of the executions and creations of all processes and data items on the user computer 120. The activity log may be programmed or otherwise configured to retain the above mentioned information for blocks of time, for example, weeks, months and years. The activity log may also be programmed or otherwise configured to overwrite information pertaining to older activity with information pertaining to recent activity. As such, the activity log retains information for a sliding window of time. In the context of this document, the term "data item" generally refers to files and registry keys.

Figure 4:
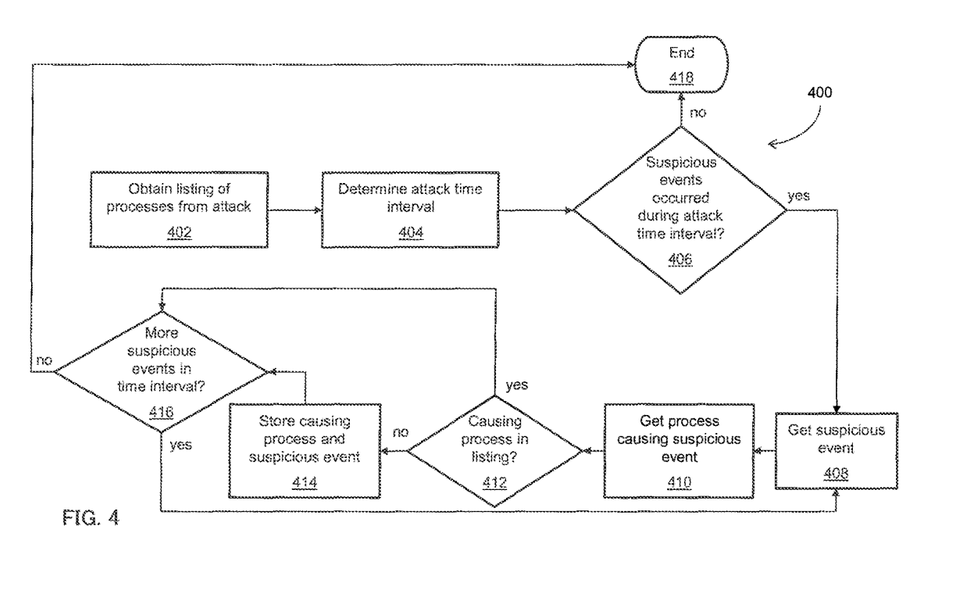
FIG. 4 is a flow diagram illustrating a process to determine suspicious events occurring during an attack according to an embodiment of the invention.

To better understand the operation of the components of the system 120', including the agent 130 and all instructions for executing the processes of FIG. 4, an example of an attack 300 as carried out on the user computer 120 is first illustrated in FIG. 3. It is noted that in order to execute the processes of FIG. 4, a listing of the processes involved in the attack is provided to the agent 130. The listing is preferably provided to the agent 130 in the form of a model of the attack, such as, for example, a tree. The listing of processes may be generated by a system outside of the system 120' and stored on a computer or device linked to the user computer 120, or may be stored in a memory or storage component of the user computer 120 outside of the system 120'. Alternatively, the system 120' itself may be configured to perform actions for generating the listing of processes, in which case the listing of processes is inherently provided to the system 120'.

In the example depicted in FIG. 3, the OS 126 of the user computer 120 is a Windows® OS. The attack 300 illustrated in FIG. 3 depicts paths that include creations of processes and data items (exemplified by thin dashed arrows), execution events in which a process executes (i.e. calls) another process (results of which are exemplified by thin solid arrows), and accesses, such as, for example, downloads, uploads, data transfers, file transfers, and process accesses (exemplified by thick solid arrows). Additional paths in alternate examples of malicious attacks may be depicted to show network operations, file modifications, registry entries, code injections, mutexes, pipes, and application arguments.

In the example attack 300 illustrated in FIG. 3, a malicious process instance of malware.exe, enters the user computer as a file malware.exe (not shown) via a download 302 from a web site, for example, www.mymail.com, accessed 305 through a web browser via the process chrome.exe. As a result, the process chrome.exe causes the creation 303 of the malware.exe executable file (and the execution of the process malware.exe). It is noted that the process chrome.exe is executed 301 by the Windows® OS process explorer.exe (which although not shown, is executed by a Windows® OS process such as, for example, userinit.exe). Although not shown in the drawings, the malicious process may be initially executed by a file (i.e., malicious file) that was extracted from a compressed file, such as, for example, a zip file, a rar file, or the like, downloaded from the web site.

The root of the attack (i.e. the root of the tree) as depicted in FIG. 3 is the initial process execution of malware.exe. The execution of the process malware.exe causes the creation 304 of the random.exe executable file. The execution of the process malware.exe also executes 306 a Windows® OS process sdbinst.exe.

The execution of the process sdbinst.exe causes the execution 308 of the created process random.exe.

The execution of the process random.exe causes the execution 314 of the process chrome.exe in order to access 316 the web site www.junkads.com. The execution of the process random.exe also causes the creation 310 of the file fake_report.pdf. The execution of the process random.exe also causes the creation 312 of the wp.exe executable file. The execution of the process random.exe also causes the execution 318 of the process wp.exe. The execution of the process wp.exe causes the creation 320 of the executable file compchecker.exe, and the creation 322 of the executable file bad.exe. The creation of the file bad.exe by the process wp.exe additionally places the file bad.exe in the OS startup folder, for example, the Windows® OS startup folder. As a result, upon rebooting (i.e., reloading of the OS 126 into memory) and/or restarting of the user computer 120, the process bad.exe is executed 324 by a Windows® OS process, such as, for example, the process explorer.exe. The reboot is depicted in FIG. 3 by a thick dashed arrow 323 indicative of a boot line.

The execution of the process bad.exe causes the access 326 of private information on the user computer 120, namely private_info.db. The execution of the process bad.exe also causes exfiltration, via transfer 328, of information accessed on the user computer 120 to external parties.

The processes executed and created during the attack illustrated in FIG. 3 span across multiple boots of the user computer 120, as depicted by the reboot 323. Specifically, the activities described by the identifiers 301-322 are executed and/or created on the user computer 120 subsequent to a first boot of the user computer 120, whereas the activities described by the identifiers 324-328 are executed and/or occur on the user computer 120 subsequent to a second boot of the user computer 120 that occurs after the first boot. As a result, the process bad.exe persists even after termination of the process wp.exe.

Accordingly, the process malware.exe, and the process bad.exe, are linked by a sequence of processes, the creations and executions (i.e., calling) of which are retained in the activity log. Each process in the sequence is successively linked to at least one other process in the sequence, and is responsible for creating or executing at least one other process in the sequence of processes. Moreover, each process stemming from the initial execution of the attack is linked to the process malware.exe by a sequence of processes. The activity log provides the agent 130 (and the system 120') with the necessary information for ascertaining the above mentioned process linkages.

The activity log also includes a listing of events provided to the agent 130 that are categorized as suspicious events. Individual suspicious events may or may not have occurred during an attack. The agent 130 is tasked with making a determination as to which suspicious events, if any, can be associated with the attack on the user computer 120. A non-exhaustive list of examples of events which may be categorized as suspicious includes, but is not limited to:

- the deletion of a process that is part of the attack;
- access or modification of a user's data items (i.e., files), such as, for example, documents, photos, and the like;
- access to a system categorized as business critical by an administrator or one or more users, such as, for example, a database application, a Point of Sale application, a banking application, and the like;
- injections into well-known processes such as, for example, OS processes (i.e., Windows® OS processes) and the like;
- the creation of a file having the same hash (e.g., MD5, SHA1 or SHA256) as another file;
- a process in which the certificate hash does not validate to the hash of a file created by the process;
- a file which does not report the presence of a certificate, even though the certificate is visible in the raw file;
- a file with a matching certificate hash but for which the certificate authority is untrusted;
- a file with an invalid hash due to the file certificate being revoked;
- a process creating a file that is not a member of the default file association list of the process;
- a process running from an atypical or abnormal location, such as, for example, % user % or % temp % directory path;
- a process lacking a digital signature;
- an HTTP post lacking a previous HTTP get;
- a process executing a number of HTTP post or HTTP put requests determined to be above a statistical threshold.

The categorization of events as suspicious events may be provided to the agent 130 by a reputation service in the form of the reputation module 134 (FIGS. 1 and 2). The reputation module 134 is typically provided on a remote server, such as, for example, a cloud server 138, which is accessible by the agent 130. Alternatively, the reputation module 134 may be installed on the user computer 120 as part of an anti-malware software suite such as, for example, Microsoft Security Essentials, Norton anti-virus, and McAfee anti-virus. Note that the reputation module 134 may also be installed as part of the agent 130. Accordingly, the agent 130 may be configured to perform actions (not shown) for categorizing events as suspicious events.

The reputation module 134, regardless of its location, may also be part of the system 120'.

The activity log preferably also includes information related to the characteristics of each suspicious event, such as, for example, time stamps (e.g. execution start time of the process that caused the suspicious event, execution end time of the process that caused the suspicious event, execution duration of the process that caused the suspicious event, time stamp of categorization/identification of an event as a suspicious event), and the name of the process and/or processes responsible for causing the suspicious event to occur. As should be apparent to one of ordinary skill in the art, a process that is responsible for the causing of a suspicious event to occur should be understood to mean that such a process, when called, resulted in the causation of the occurrence of the suspicious event.

In an exemplary series of processes to identify suspicious events occurring during an attack, and involved with the attack, on the user computer 120, the system 120' is initially provided with a listing of the processes involved in the attack. Such a listing may be in the form a tree depicting the attack, such as, for example, the tree based model of the attack depicted in FIG. 3. The system 120' determines a time interval associated with the attack based on time stamp information associated with the execution start and stop time of the processes in the listing which is stored in the activity log.

The system 120' then makes a determination, by, for example, comparing and/or correlating time stamp information, if any suspicious events occurred during the time interval associated with the attack. The system 120' then analyzes any suspicious events that occurred during such a time interval. The analysis performed by the system 120' includes identifying, by, for example, retrieving information stored in the activity log, the process and/or processes which caused the suspicious events to occur.

The system 120' then determines if any of the process and/or processes which caused the suspicious events to occur are also in the provided listing of the processes involved in the attack. The suspicious events caused by any such processes which are not in the provided listing may then be stored, categorized and/or labeled by the system 120' as, for example, potentially malicious events, for further examination and evaluation. Such stored, categorized and/or labeled suspicious events allow the agent 130 to initiate (by signaling) the taking of protective actions by the user computer 120. Such protective actions may also include remediation actions such as: 1) displaying a message, warning window, or the like, on the user computer 120; 2) suspending the administrative account of the user, for example, by locking the user computer 120; 3) alerting or notifying the system administrator 160 about this security incident; and 4) quarantining the user computer 120, e.g., blocking the user computer 120 from accessing the network 110, or otherwise disconnecting the user computer 120 from the network 110, or disabling the user computer 120.

Attention is now directed to FIG. 4 which shows a flow diagram detailing a computer-implemented process 400 in accordance with embodiments of the disclosed subject matter. This computer-implemented process includes an algorithm for identifying and determining involvement, in an attack, of suspicious events occurring during the attack on the user computer 120. Reference is also made to the elements shown in FIGS. 1-3. The process and sub-processes of FIG. 4 are computerized processes performed by the system 120' including, for example, the CPU 122 and associated components, such as the agent 130, at the user computer 120, which as shown represents a client or client computer. The aforementioned processes and sub-processes are for example, performed automatically, but can be, for example, performed manually, and are performed, for example, in real time.

The process 400 begins at block 402. As previously mentioned, in order for the system 120' to identify suspicious events occurring during the attack, and potentially involved with the attack, on the user computer 120, the agent is first provided with a listing of the processes involved in the attack. In block 402, the system 120' obtains the listing of the processes involved in the attack, preferably in the form of a tree depicting the attack, such as, for example, the tree based model of the attack depicted in FIG. 3. It is noted that the system 120' may also be configured to perform actions (not shown) for creating the listing of processes by, for example, constructing the tree illustrating the attack. In embodiments in which the system 120' is not configured to perform actions for creating the listing of processes, the system 120' may request to receive the listing of processes from a computer or device linked to the system 120' (i.e., linked to the user computer 120 via the network 110 or the network 170), or request to receive the listing of process from a memory or storage component of the user computer 120 outside of the system 120'.

The execution of block 402 is preferably performed by the system 120' upon the completion of the listing of the processes involved in the attack. In practice, upon completion of the model (i.e. tree based model) of the attack, block 402 is immediately executed by the system 120' in order to more quickly be able to identify other suspicious events that occurred during the attack. Note that the listing of the processes involved in the attack may be generated or provided to the system 120' while the attack is ongoing, allowing the system 120' to perform the functionality as disclosed herein concurrently with an ongoing attack.

Using the example of the attack 300 depicted in FIG. 3, the processes involved in the attack 300 are the processes instances of the following executable files: malware.exe, sdbinst.exe, random.exe, wp.exe, compchecker.exe, explorer.exe, and bad.exe. As will be discussed, the process 400 involves determinations made based on characteristics of processes instances of the corresponding executable files.

The process 400 as shown in FIG. 4 is an iterative process, and entails making determinations for each respective suspicious event caused by a process instance of a respective executable file. In practice, the processes involved in the attack are initially stored as a sequential collection of processes, such as, for example, in a first-in-first-out data buffer (i.e. queue) or a last-in-first-out data stack.

The process 400 moves to block 404 where the system determines a time interval associated with the attack, and more specifically, the time span of the attack. The time interval is preferably a function of the execution start and stop times of the processes in the listing (obtained in block 402) as stored in the activity log, and is defined by a start time ($T_S$) and an end time ($T_E$). As such, the system obtains the execution start and stop times of the processes in the listing from the activity log and determines a time interval associated with the attack based on the individual processes start and stop times.

In a non-limiting implementation, the system defines the start time ($T_S$) of the attack as the execution start time of the process having the earliest chronological execution start time of the processes in the listing obtained in block 402. In other words, the start time ($T_S$) of the attack is defined as the minimum of value in the collection of execution start times of the processes in the listing. Similarly, the system defines the end time ($T_E$) as the execution end time of the process having the latest chronological execution end time of the processes in the listing. In other words, the end time ($T_E$) of the attack is defined as the maximum of value in the collection of execution end times of the processes in the listing.

For example, if the listing of processes obtained in block 402 includes three processes having respective execution start times of $ts_1$, $ts_2$, and $ts_3$, and respective execution end times $te_1$, $te_2$, and $te_3$, the system may define the attack start time ($T_S$) as min($ts_1$, $ts_2$, $ts_3$) and the attack end time ($T_E$) as max($te_1$, $te_2$, $te_3$), where min( ) denotes a function which returns a minimum value, and max( ) denotes a function which returns a maximum value.

Note that if any or all of the processes in the listing are concurrently running during the execution of any of the steps of FIG. 4 (i.e., if the attack is ongoing), the attack end time ($T_E$) is defined as the present time, which may be the present time indicated by the CPU 122.

The start time ($T_S$) of the attack may be offset by a typically small amount in order to increase the likelihood that the time interval determined in block 404 includes the beginning of the attack. For example, if the start time ($T_S$) of the attack is determined in block 404 to be 12:00:20 EST, the start time ($T_S$) of the attack may be offset by several seconds, for example 20 seconds, rendering the start time ($T_S$) of the attack as 12:00:00 EST. Similarly, the end time ($T_E$) of the attack may be offset by a typically small amount in order to increase the likelihood that the time interval determined in block 404 includes the end of the attack. For example, if the end time ($T_E$) of the attack is determined in block 404 to be 12:29:30 EST, the end time ($T_E$) of the attack may be offset by several, for example 30 seconds, rendering the end time ($T_E$) of the attack as 12:30:00 EST. Accordingly, the time interval associated with the attack may be expressed as [$T_S-\delta_S$, $T_E+\delta_E$], where $\delta_S$ is the attack start time offset and $\delta_E$ is the attack end time offset. It is noted herein that the attack start and end times may be offset by the same amounts, or may offset by different amounts. In other words, $\delta_S$ and $\delta_E$ may be, but are not necessarily, equal.

Upon the determination of the attack time interval in block 404, the process moves to block 406 where a determination is made as to whether any suspicious events occurred during the time interval associated with the attack. The determination is made by comparing and/or correlating time stamp information associated with each suspicious event with time interval associated with the attack. As previously mentioned, the time stamp information is stored in the activity log, and includes, but is not limited to, the execution start time of the process that caused the suspicious event, the execution end time of the process that caused the suspicious event, the execution duration of the process that caused the suspicious event, and the time stamp of categorization/identification of an event as a suspicious event.

If the system determines that at least one suspicious events occurred during the time interval associated with the attack, the process 400 moves to block 408, where each suspicious event that occurred during the time interval associated with the attack is retrieved, for example from the activity log, for analysis, as will be further described below. If no suspicious events occurred during the time interval associated with the attack, the process 400 moves to block 418 and ends.

As mentioned above, if any suspicious events occurred during the time interval associated with the attack, the process 400 moves from block 406 to block 408. Note that the process 400 is an iterative process performed for each of the suspicious events that occurred during the time interval associated with the attack. In practice, the suspicious events that occurred during the time interval associated with the attack are initially stored as a sequential collection of events (and related processes which caused such events), such as, for example, in a first-in-first-out data buffer (i.e. queue) or a last-in-first-out data stack. For clarity, the suspicious event analyzed at each iterative step is referred to hereinafter as the "rendered suspicious event". When stored as a first-in-first-out data buffer, the rendered suspicious event is the suspicious event that is dequeued from the suspicious event data buffer. When stored as a last-in-first-out data stack, the suspicious event is the suspicious event that is popped from the suspicious event data stack.

Accordingly, the process 400 moves from block 406 to block 408 to obtain the rendered suspicious event (i.e. dequeued from the suspicious event data buffer or popped from the suspicious event data stack) in order to be able to determine whether the rendered suspicious event is involved with the attack. The process 400 then moves to block 410.

In block 410, the process and/or processes responsible for the causation of the rendered suspicious event is identified based on information stored in the activity log. The process 400 moves to block 412 where the system determines whether the process responsible for the causation of the rendered suspicious event is included in the listing of processes involved in the attack. If the process responsible for the causation of the rendered suspicious event is excluded from the listing of processes involved in the attack (i.e., the listing of process obtained in block 402), the process 400 moves to block 414 where the suspicious event, and preferably the process and characteristics of the process responsible for the causation of the suspicious event, are stored in a memory or database, such as, for example, the database 132. Such process characteristics may include executable file information of the process, process execution time stamp information, information related to processes executed by the process, and any processes which caused the execution of the process (i.e., a parent process of the process). The execution of block 414 serves as the principle output of the process 400, and enables the system to perform further processing and/or protective actions against processes associated with such stored events that occurred during the attack.

The process 400 then moves to block 416 where a determination is made by the system as to whether there are additional suspicious events that occurred during the time interval associated with the attack. If there are no more suspicious events that occurred during the time interval associated with the attack, the process 400 moves to block 418 and ends. If there are more suspicious events that occurred during the time interval associated with the attack, the process 400 returns to block 408 to obtain the next suspicious (i.e. dequeue from the suspicious event data buffer or pop from the suspicious event data stack) event that occurred during the time interval associated with the attack.

From block 412, if the process responsible for the causation of the rendered suspicious event is included in the listing of processes involved in the attack, the process 400 moves directly to block 416, bypassing block 414.

As a result of the steps executed by the process 400, in particular the execution of block 414, a listing is compiled of suspicious events whose corresponding processes are responsible for the causation of the suspicious events that occurred approximately during the attack but that are were explicitly initially excluded from the listing of processes involved in the attack as obtained by the system (i.e., processes that were not included in the model of the attack). Such suspicious events are referred to interchangeably as "uncorrelated suspicious events", in that the processes responsible for the causation of such suspicious events are not included in the listing of processes involved in the attack as obtained by the system, and therefore may initially appear as uncorrelated to the processes involved in the attack.

As previously discussed, the processes executed and created during the attack (e.g. FIG. 3) may span across multiple boots of the user computer 120. Accordingly, the processes analyzed during the steps executed by the process 400 may be processes that were executed and/or created across multiple boots of the user computer 120. As such, the above mentioned compiled listing of suspicious events, resulting from the execution of the steps of the process 400, may include suspicious events that occurred after different boots and/or restarts of the user computer 120.

The uncorrelated suspicious events stored by the execution of block 416 may be categorized and/or labeled by the system for further examination and evaluation. For example, suspicious events which are categorized and/or labeled as uncorrelated suspicious events allow the agent 130 to initiate (by signaling) the taking of protective actions by the user computer 120. Such protective actions may also include remediation actions such as: 1) displaying a message, warning window, or the like, on the user computer 120; 2) suspending the administrative account of the user, for example, by locking the user computer 120; 3) alerting or notifying the system administrator 160 about this security incident; and 4) quarantining the user computer 120, e.g., blocking the user computer 120 from accessing the network 110, or otherwise disconnecting the user computer 120 from the network 110, or disabling the user computer 120.

The process or processes responsible for the causation of the uncorrelated suspicious events may subsequently be provided to a reputation service (e.g. the reputation module 134) by the system in order to allow the system to more quickly identify, and take protective actions against, future malicious attacks.

Additional protective actions taken by the user computer 120 as initiated by the agent 130 may also include remediation actions and damage assessment of data items created or altered as the result of such uncorrelated suspicious events. For example, if a process responsible for the causation of an uncorrelated suspicious event is in actuality a malicious process that causes overwriting a key registry value, the system can revert and/or restore the key registry value to the original registry value.

As previously mentioned, the execution of the steps of the process 400 is contingent upon a model, preferably a tree based model, of the attack that depicts the chain of malicious process calls during the attack. The model includes the initial execution of the malicious process and all processes successively linked to the malicious process as well as all data items created by processes called by the malicious process or called by the malicious process itself. The methodology of the determination of the initial execution of the malicious process (i.e., the root of the attack model) is disclosed in the applicants' commonly owned U.S. patent application, entitled "Method and System for Determining Initial Execution of an Attack" (U.S. patent application Ser. No. 14/963,265), filed Dec. 9, 2015, the disclosure of which is incorporated by reference in its entirety herein.

The example of the attack 300 in FIG. 3 serves as an example tree based model of an attack. As noted, the system may include modules (not shown) programmed to construct such a tree based model of the attack. The methodology of the construction of such a tree based model is disclosed in the applicants' commonly owned U.S. patent application, entitled "Method and System for Modeling All Operations and Executions of an Attack and Malicious Process Entry" (U.S. patent application Ser. No. 14/963,267), filed Dec. 9, 2015, the disclosure of which is incorporated by reference in its entirety herein.

As such, modules of the system may be programmed to construct a new tree for each process responsible for the causation of the respective uncorrelated suspicious event, or add any or all processes responsible for the causation of the respective uncorrelated suspicious events to existing attack trees. For example, if a process p is excluded from the listing of processes involved in the attack but is responsible for creating an uncorrelated suspicious event, the system may construct and/or generate a new tree with the process p as the root. Similar to the tree based model of the attack depicted in FIG. 3, the new tree with process p as the root would also include all processes executed directly or indirectly by the process p, as well as all data items modified or created by processes that were created or executed by the process p, or executed by the process p itself.

Although the process 400 as described thus far has pertained to an iterative process that iterates on each of the suspicious events that occurred during a specific time interval, other embodiments are possible in which any or all of the iterative steps are removed and executed by parallel processing techniques. In such an embodiment, for example, block 408 could be removed and multiple instances of block 410 could be executed in parallel for each of the suspicious events occurring within the time interval of the attack determined by block 404.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Drawings illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for identifying events associated with a malware attack initiated on a computerized endpoint, comprising:
    obtaining a listing of a sequence of processes executed or created on the computerized endpoint during the malware attack, the sequence of processes in the listing including a first process, that includes a root of the malware attack, and a plurality of processes, each respective process in the plurality of processes being traceable back to the first process through a linkage formed from a combination of executions and creations of the processes in the sequence of processes, wherein the plurality of processes includes all processes that are linked to the first process, wherein the root is the first malicious execution on the computerized endpoint that is part of the malware attack;
    retrieving at least one event that occurred on the computerized endpoint during a time interval associated with the malware attack; and
    determining that occurrence of the at least one event that occurred on the computerized endpoint during the time interval associated with the malware attack was caused by the execution of a process excluded from the obtained listing of the sequence of processes.

2. The method of claim 1, further comprising:
    identifying the process that when executed caused the occurrence of the at least one event.

3. The method of claim 2, further comprising:
    storing in a memory at least one characteristic of the process that when executed caused the occurrence of the at least one event.

4. The method of claim 1, further comprising:
    determining the time interval associated with the malware attack.

5. The method of claim 4, wherein the time interval associated with the malware attack is defined in part by a respective start time associated with each process in the listing of processes and a respective end time associated with each process in the listing of processes.

6. The method of claim 1, wherein the at least one event is selected from the group consisting of: an access or modification of a data item in a user directory of the computerized endpoint, an injection into an operating system process of the computerized endpoint, a deletion of at least one process from the listing of processes, an access to a data item or application on the computerized endpoint that satisfies a user defined classification criterion, a process executed on the computerized endpoint lacking a digital signature, a data item having a digital certificate obtained from an untrusted certificate authority, and the creation of a first file having the same hash value as the hash value of a second file.

7. The method of claim 1, further comprising:
    storing in a memory the at least one event.

8. The method of claim 1, wherein the listing of processes includes a model of the malware attack on the computerized endpoint.

9. The method of claim 8, wherein the model of the malware attack is a tree structured model.

10. The method of claim 1, wherein the analyzing whether the at least one event occurred on the computerized endpoint during the time interval associated with the malware attack includes:
    obtaining a listing of events that occurred on the computerized endpoint; and
    determining whether any of the events rendered from the listing of events occurred during the time interval associated with the malware attack.

11. The method of claim 1, further comprising:
    taking at least one protective action.

12. The method of claim 11, wherein the at least one protective action includes restoring at least one value of a data item to an original value.

13. The method of claim 1, wherein the at least one event is a suspicious event.

14. A computer system for identifying events associated with a malware attack initiated on a computerized endpoint, comprising:
    a non-transitory storage medium for storing computer components; and
    a computerized hardware processor for executing the computer components comprising:
        a computer module configured for:
            obtaining a listing of a sequence of processes executed or created on the computerized endpoint during the malware attack, the sequence of processes in the listing including a first process, that includes a root of the malware attack, a plurality of processes, each respective process in the plurality of processes being traceable back to the first process through a linkage formed from a combination of executions and creations of the processes in the sequence of processes, wherein the plurality of processes includes all processes that are linked to the first process, wherein the root is the first malicious execution on the computerized endpoint that is part of the malware attack;
            retrieving at least one event that occurred on the computerized endpoint during a time interval associated with the malware attack; and
            determining that occurrence of the at least one event that occurred on the computerized endpoint during the time interval associated with the malware attack was caused by the execution of a process excluded from the obtained listing of the sequence of processes.

15. The computer system of claim 14, further comprising:
    a database for storing a listing of events that occurred on the computerized endpoint during the malware attack.

16. The computer system of claim 15, wherein the computer module is further configured for:
    retrieving the listing of events that occurred on the computerized endpoint from the database, and
    determining whether any of the events rendered from the listing of events occurred during the time interval associated with the malware attack.

17. The computer system of claim 14, further comprising:
a database for storing the at least one event, and wherein the computer module is further configured for:
storing the at least one event in the database.

18. The computer system of claim 14, wherein the computer module is further configured for:
identifying the process that when executed caused the occurrence of the at least one event.

19. The computer system of claim 18, further comprising:
a database for storing at least one characteristic of the process that when executed caused the occurrence of the at least one event, and wherein the computer module is further configured for:
storing the at least one characteristic of the process in the database.

20. The computer system of claim 14, wherein the computer module includes an agent.

21. A computer usable non transitory storage medium having a computer program embodied thereon for causing a suitable programmed system to identify events associated with a malware attack initiated on a computerized endpoint, by performing the following steps when such program is executed on the system, the steps comprising:
obtaining a listing of a sequence of processes executed or created on the computerized endpoint during the malware attack, the sequence of processes in the listing including a first process, that includes a root of the malware attack, and a plurality of processes, each respective process in the plurality of processes being traceable back to the first process through a combination of executions and creations of the processes in the sequence of processes, wherein the root is the first malicious execution on the computerized endpoint that is part of the malware attack;
retrieving at least one event that occurred on the computerized endpoint during a time interval associated with the malware attack; and
determining that occurrence of the at least one event that occurred on the computerized endpoint during the time interval associated with the malware attack was caused by the execution of a process excluded from the obtained listing of the sequence of processes.

* * * * *